(12) United States Patent
Kaltenbach (10) Patent No.: US 9,327,713 B2
(45) Date of Patent: May 3, 2016

(54) HYBRID DRIVE OF A MOTOR VEHICLE AND METHOD FOR CONTROLLING SAME

(75) Inventor: Johannes Kaltenbach, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 175 days.

(21) Appl. No.: 13/806,687

(22) PCT Filed: May 5, 2011

(86) PCT No.: PCT/EP2011/057171
§ 371 (c)(1),
(2), (4) Date: Jul. 22, 2013

(87) PCT Pub. No.: WO2012/000706
PCT Pub. Date: Jan. 5, 2012

(65) Prior Publication Data
US 2013/0288850 A1 Oct. 31, 2013

(30) Foreign Application Priority Data

Jun. 28, 2010 (DE) .......................... 10 2010 030 569

(51) Int. Cl.
*F16D 21/06* (2006.01)
*B60W 10/113* (2012.01)
(Continued)

(52) U.S. Cl.
CPC ............. *B60W 20/10* (2013.01); *B60K 6/387* (2013.01); *B60K 6/405* (2013.01); *B60K 6/48* (2013.01); *B60K 6/547* (2013.01); *B60W 10/113* (2013.01);
(Continued)

(58) Field of Classification Search
CPC .................. F16H 2003/008; F16H 2003/0811
USPC ................................... 475/152, 313
See application file for complete search history.

(56) References Cited

U.S. PATENT DOCUMENTS 6,645,105 B2    11/2003  Kima
8,122,991 B2 *   2/2012  Roth ............................. 180/165
(Continued)

FOREIGN PATENT DOCUMENTS

DE        199 60 621 A1    6/2001
DE        101 33 695 A1    3/2002
(Continued)

OTHER PUBLICATIONS

Office Action issued in corresponding DE Appln. No. 10 2010 030 569.3 on Oct. 28, 2011 (6 pgs).
(Continued)

*Primary Examiner* — Mark Manley
(74) *Attorney, Agent, or Firm* — Brinks Gilson & Lione (57) ABSTRACT

A hybrid drive of a motor vehicle comprises an internal combustion engine with a drive shaft, an electric machine having a rotor and being operable as a motor and as a generator, and a multistage conventional gearbox with two coaxially arranged input shafts and a common output shaft. The first input shaft is arranged centrally within the second input shaft which is embodied as a hollow shaft. The first input shaft can be connected to the drive shaft of the internal combustion engine via an assigned clutch; the second input shaft has a drive connection to the rotor of the electric machine; and the two input shafts can be selectively placed in a drive connection with the output shaft via a plurality of gearwheel sets with a different transmission ratio and a shiftable speed clutch.

11 Claims, 5 Drawing Sheets

(51) Int. Cl.
  *F16H 3/08*   (2006.01)
  *F16H 3/093*  (2006.01)
  *B60W 20/00*  (2016.01)
  *B60K 6/387*  (2007.10)
  *B60K 6/405*  (2007.10)
  *B60K 6/48*   (2007.10)
  *B60K 6/547*  (2007.10)
  *B60W 30/19*  (2012.01)
  *F16H 3/00*   (2006.01)
  *F16H 3/097*  (2006.01)

(52) U.S. Cl.
  CPC ............... *B60W 30/19* (2013.01); *F16D 21/06* (2013.01); *B60W 20/00* (2013.01); *F16H 3/006* (2013.01); *F16H 3/093* (2013.01); *F16H 3/097* (2013.01); *F16H 2003/0811* (2013.01); *Y02T 10/6221* (2013.01); *Y02T 10/76* (2013.01); *Y10S 903/902* (2013.01); *Y10T 477/26* (2015.01)

(56) References Cited

U.S. PATENT DOCUMENTS

| | | | |
|---|---|---|---|
| 8,784,245 B2* | 7/2014 | Ideshio et al. | 475/5 |
| 2001/0019980 A1* | 9/2001 | Kanehisa | 475/5 |
| 2002/0082134 A1* | 6/2002 | Hirt et al. | 477/3 |
| 2003/0221515 A1 | 12/2003 | Grillo et al. | |
| 2006/0130601 A1 | 6/2006 | Hughes | |
| 2007/0095584 A1* | 5/2007 | Roske et al. | 180/65.2 |
| 2008/0227592 A1* | 9/2008 | Steffen et al. | 477/19 |
| 2009/0082151 A1* | 3/2009 | Tabata et al. | 475/5 |
| 2010/0120580 A1* | 5/2010 | Mepham et al. | 477/3 |

FOREIGN PATENT DOCUMENTS

| | | |
|---|---|---|
| DE | 10 2005 035 328 A1 | 3/2007 |
| DE | 10 2006 036758 A1 | 2/2008 |
| DE | 10 2006 059 591 A1 | 6/2008 |
| EP | 0 845 618 A2 | 6/1998 |
| EP | 1 209 017 A2 | 5/2002 |
| EP | 1 610 038 A1 | 12/2005 |
| EP | 1 972 481 A1 | 9/2008 |
| EP | 2 281 727 A1 | 2/2011 |
| FR | 2 811 395 A1 | 1/2002 |
| WO | WO 2008/138387 A1 | 11/2008 |
| WO | WO 2009/147501 A2 | 12/2009 |
| WO | WO 2009/148019 A1 | 12/2009 |

OTHER PUBLICATIONS

International Search Report from PCT/EP2011/057171 dated Oct. 17, 2011 (English Translation) (5 pgs).

International Search Report and Written Opinion from PCT/EP2011/057171 dated Oct. 17, 2011 (German Language) (24 pgs).

* cited by examiner

(Conventional Art)

HYBRID DRIVE OF A MOTOR VEHICLE AND METHOD FOR CONTROLLING SAME

This application is a filing under 35 U.S.C. §371 of International Patent Application PCT/EP2011/057171, filed May 5, 2011, and claims the priority of DE 10 201 0 030 569.3, filed Jun. 28, 2010. These applications are incorporated by reference herein in their entirety.

The invention relates to a hybrid drive of a motor vehicle which exhibits an internal combustion engine with a drive shaft, an electric machine that can be operated as an engine and as a generator with a rotor and a multistage conventional gearbox with two input shafts and a common output shaft, wherein the first input shaft is arranged coaxially within the second input shaft embodied as a hollow shaft, at least the first input shaft can be joined to the drive shaft of the internal combustion engine via a controllable friction clutch, the second input shaft is in drive connection with the rotor of the electric machine and both input shafts can each be selectively brought into drive connection with the output shaft via a plurality of shiftable gearwheel sets with different transmission ratios. In addition, the invention relates to process flows for controlling the inventive hybrid drive.

It is already known to create a hybrid drive from a double clutch transmission provided for a motor vehicle, which can be connected to the drive shaft of an internal combustion engine or can be brought into drive connection on the input side via two friction clutches, through the arrangement of an electric machine which can be operated as an engine and as a generator on an input shaft, output shaft or countershaft.

For example, in DE 101 33 695 A1 several possibilities are disclosed for arranging an electric machine in the case of different designs of double clutch transmissions. For example, the electric machine can be arranged coaxially on the free end of an input shaft or of a countershaft, wherein the rotor is directly rotationally fixed to the relevant transmission shaft, or in the case of a countershaft if applicable can be in drive connection with the associated input shaft via its input constant. Likewise the electric machine can be arranged paraxial to an input shaft or a countershaft, wherein the rotor is in drive connection with the relevant transmission shaft via a spur gear transmission, or in the case of a countershaft using the gears of a gearwheel set can be in drive connection with an input shaft. It is also possible to have the electric machine arranged coaxially via an input shaft or an output shaft, wherein a hollow constructed rotor can be either directly rotationally fixed to the relevant transmission shaft or in the case of an output shaft using the gears of a gearwheel set can be in drive connection with an adjacent countershaft and if applicable via its input constant to the assigned input shaft.

Additional possibilities for the arrangement of an electric machine within a double clutch transmission with two input shafts arranged coaxially on top of one another and two countershafts arranged coaxially on top of one another are known from DE 10 2005 035 328 A1.

However, these known designs of hybrid drives exhibit the disadvantage that with the arrangement of the electric machine, the axial and radial dimensions of the original double clutch transmission can no longer be met. If the electric machine is arranged within the transmission housing, an axial or radial expansion of the transmission dimensions is bound to occur, since the original double clutch transmission is usually compactly built and is not designed for the accommodation of an additional aggregate. In addition a transmission-internal gear internal arrangement of an electric machine is problematic with respect to an enclosure against penetrating transmission oil, an effective cooling and accessibility for repair and maintenance work.

In the case of a gear external arrangement of the electric machine, e.g., at a free end of a transmission shaft extended outward, it is true that the required design changes to the original double clutch transmission are relatively slight. However, the installation space occupied by a hybrid drive of such design is likewise greater vis-à-vis the original double clutch transmission, as a result of which the optional integration of the hybrid drive in an existing motor vehicle in place of the original double clutch transmission is made difficult and often not possible without expensive modifications to the motor vehicle body. In addition, in the case of a gear external arrangement of the electric machine most of the arrangement options described previously are omitted.

In addition manual transmissions with an integrated electric machine have been proposed, which exhibit two input side transmission shafts, in particular two countershafts, each of which being able to be brought into drive connection via a plurality of shiftable gearwheel sets with a different transmission ratio selectively with a common output shaft. These manual transmissions correspond in their principal structure by and large to a double clutch transmission. However, only one transmission shaft on the input side can be connected directly or indirectly to the drive shaft of an internal combustion engine, and the other transmission shaft on the input side is in direct or indirect drive connection with the rotor of the electric machine.

In the case of a first such hybrid drive in accordance with U.S. Pat. No. 6,645,105 B2, a first transmission shaft on the input side can be connected via a friction clutch, while the second transmission shaft on the input side is in drive connection with the rotor of the electric machine and the first transmission shaft on the input side via an input constant and a superposition transmission designed as a simple planetary transmission. For the transmission of an electromotive or internal combustion engine torque via a gear stage assigned to the second transmission shaft on the input side, a corresponding torque strut within the superposition transmission through the internal combustion engine or the electric machine is necessary. In addition the electric machine must be operable in both directions of rotation as a motor and as a generator for the fulfillment of a wide range of functions (four quadrant operation), which requires a correspondingly expensive design of the electric machine and its control system. Also, a purely electric drive operation with a switched off internal combustion engine and opened friction clutch is not possible with this known hybrid drive.

In the case of an additional such hybrid drive in accordance with WO 2008/138387 A1, a first transmission shaft on the input side can be connected to the drive shaft of the internal combustion engine via a friction clutch, while the second transmission shaft on the input side is directly rotationally fixed to the rotor of the electric machine. In order to be able to use at least some gear stages of the respective other transmission shaft on the input side for the transmission of an electromotive or internal combustion engine torque, two gearwheel sets of the first and second transmission shafts on the input side are each arranged on a common radial plane and each use a common gear embodied as a movable gear and arranged on the common output shaft, while the relevant gears arranged on the second transmission shaft on the input side are embodied as fixed gears. Through this special arrangement of fixed gears and movable gears differences arise which in the case of deriving of the hybrid drive from a double clutch transmission extensively identical in construction would require significant design modifications.

Finally, in DE 199 60 621 B4 three embodiments of such a hybrid drive are described in which case a first countershaft can be brought into drive connection with the drive shaft of the internal combustion engine via a first input constant, an input shaft and a controllable friction clutch. A second countershaft is either directly rotationally fixed to the rotor of the electric machine (see FIG. 1 of DE 199 60 621 B4) or is in drive connection with said rotor via a second input constant (see FIGS. 2 and 3 of DE 199 69 621 B4). In order to be able to use at least some gear stages of the respective other countershaft for the transmission of an electromotive or internal combustion engine torque, either the second countershaft can be connected to the output gear of the second input constant via an engageable and disengageable shifting clutch and can be coupled to the input shaft via the drive gear of the second input constant (see FIG. 1 of DE 199 60 621 B4) or the drive gear of the second input constant connected in rotationally fixed manner to the rotor of the electric machine arranged coaxially via the input shaft can be coupled to the input shaft (see FIGS. 2 and 3 of DE 199 69 621 B4). The shifting clutch is arranged on the side of the second input constant opposite the motor and hence within the manual transmission, as a result of which a corresponding higher modification effort compared to a double clutch transmission extensively identical in construction, in particular in the second and third embodiment of this hybrid drive and an axial expansion of the transmission dimensions, arises due to the axially staggered arrangement of the input constants there.

The known hybrid drives hence exhibit the significant disadvantage that they either have specially developed manual transmissions or manual transmissions derived with high design expenditure from double clutch transmissions which have higher production costs and/or enlarged dimensions. As a result of this, the integration of a corresponding hybrid drive into an existing motor vehicle as an alternative to a conventional drive is made significantly more difficult or disadvantageous and is only possible with high design and financial expenditure.

The present invention addresses the problem of proposing a hybrid drive of a motor vehicle based on a double clutch transmission of the initially named type which is constructed simple and in a space saving manner as well as without great design changes that can be integrated into a motor vehicle as an alternative drive. In addition process flows for the control of such an inventive hybrid drive are to be specified.

A first inventive solution of the problem related to the structural design of the hybrid drive consists in conjunction with the features of the preamble of Claim 1 in that only the first input shaft of the transmission can be connected to the drive shaft of the internal combustion engine via an assigned separating clutch, and that the first input shaft as well as the second input shaft can be coupled to one another via a positive shifting clutch that can be engaged and disengaged.

A second inventive solution of the problem related to the structural design of the hybrid drive consists in conjunction with the features of the preamble of dependent Claim 2 in that only the first input shaft can be connected to the drive shaft of the internal combustion engine via an assigned separating clutch, and that a part of the separating clutch on the motor side and the second input shaft can be coupled to one another via a positive shifting clutch that can be engaged and disengaged.

The separating clutch is in particular designed as a friction clutch which is also suitable as a starting clutch.

Claims 3 through 11 contain advantageous embodiments and further developments of the inventive hybrid drive.

Thus, the invention proceeds from a hybrid drive of a motor vehicle which comprises an internal combustion engine with a drive shaft, an electric machine that can be operated as a motor and as a generator, and a multistage manual transmission with two coaxially arranged input shafts and a common output shaft. The first input shaft is arranged centrally within a second input shaft designed as a hollow shaft. At least the first input shaft can be connected to the drive shaft of the internal combustion engine via an assigned separating clutch. The second input shaft is in drive connection with the rotor of the electric machine. In addition both input shafts can each be selectively brought into drive connection with the output shaft via a plurality of gearwheel sets with variable transmission and a shiftable speed clutch.

The inventive hybrid drive is based on the structure of a by and large equivalent double clutch transmission, in which case a second separating clutch through which the second input shaft can usually be connected to the drive shaft of the internal combustion engine is omitted. Instead of this, in the case of the inventive hybrid drive the second input shaft is in drive connection with the rotor of the electric machine and can be coupled via the provided shifting clutch to the first input shaft or to the part of the remaining separating clutch on the motor side, i.e., to the drive shaft of the internal combustion engine.

As a result of this the two parallel power transmission branches on the input side can be coupled to one another and are hence both available for power transmission in the first embodiment of the hybrid drive for the internal combustion engine and the electric machine as well as in the second embodiment of the hybrid drive for the internal combustion engine.

For realization of the inventive hybrid drive only comparatively slight design modifications are necessary vis-à-vis the double clutch transmission. Since these modifications are only located in the region of the input shafts lying outside of the transmission housing, the basic transmission can be adopted from the double clutch transmission by and large unchanged. Due to the special structure of the hybrid drive the electric machine can be employed for starting the internal combustion engine, in boost operation, in recuperation operation, in pure electric drive operation and for bridging an interruption of traction or thrust caused by shifting in internal combustion engine operation.

The electric machine and the shifting clutch are therefore preferably arranged outside of a transmission housing of the manual transmission between the separating clutch and a front wall on the motor side of the transmission housing and, together with the separating clutch advantageously occupy the installation space of a double clutch arrangement of a by and large equivalent double clutch transmission.

The shifting clutch can in the process be embodied as a friction-synchronized synchronous clutch. However, it is also possible to construct the shifting clutch as an unsynchronized dog clutch which can be produced more cost-effectively, is more compact and robust. Depending on the shifting situation the synchronization of the shifting clutch can take place via the electric machine or the internal combustion engine, in the first embodiment of the hybrid drive in combination with an at least partial closing of the separating clutch.

Since the electric machine can also be used for the synchronization of speed clutches at least the speed clutches of the gearwheel sets assigned to the second input shaft can be embodied as unsynchronized dog clutches.

In order to make optimum use of the existing installation space the electric machine is preferably arranged coaxially over the second input shaft, wherein the rotor of the electric machine can be directly rotationally fixed to the second input shaft or can be in drive connection via a transmission stage to the second input shaft.

The transmission stage is in this case expediently embodied as a simple planetary transmission with a hollow gear, a planetary carrier with a plurality of planetary gears in meshing engagement with the hollow gear and a sun gear in meshing engagement with the planetary gears, wherein the hollow gear is rotationally fixed to the rotor of the electric machine, the planetary carrier is rotationally fastened on the second input shaft and the sun gear is latched rigidly to the housing.

However, it is also possible to have the electronic machine EM arranged axially parallel to the second input shaft and have the rotor of the electric machine in drive connection with the second input shaft via a transmission stage.

In this case the transmission stage can be embodied as a spur gear transmission with a first gear rotationally fixed to the rotor of the electric machine and a second gear rotationally fixed to the second input shaft as well as being in meshing engagement with the first gear.

It is also possible to have the transmission stage embodied as a chain transmission with a first chain sprocket rotationally fixed to the rotor of the electric machine and a second chain sprocket arranged in rotationally fixed manner on the second input shaft as well as being in positive drive connection with the first chain sprocket via a closed link chain.

A further possibility consists in having the transmission stage embodied as a belt transmission with a first pulley rotationally fixed to the rotor of the electric machine and a second pulley arranged in rotationally fixed manner on the second input shaft as well as being in non-positive drive connection with the first pulley.

Regardless of the arrangement of the electric machine and the construction of the transmission stage, the transmission stage exhibits expediently exhibits a transmission ratio in the range between iKE=1.25 and iKE=1.67, since the electric machine as a result of this can be embodied to be lower output and correspondingly more compact as well as lighter without the increase in service speeds of the electric machine associated therewith leading to critically high values.

In the case of the described first embodiment of the inventive hybrid drive, according to the method provision is made at the pulse starting of the internal combustion engine that in the event of an opened separating clutch and disengaged gears G1-G7, R first the shifting clutch engages and then the second input shaft is accelerated by the electric machine up to a predefined pulse starting speed lying above the starting speed of the internal combustion engine and that the internal combustion engine is then started by a rapid closing of the separating clutch by means of the angular momentum of the electric machine.

In the case of the two embodiments of the inventive hybrid drive provision is made for normal electric start of the internal combustion engine that in the event of an opened separating clutch and disengaged gears G1-G7, R the shifting clutch engages and as needed, i.e., in the case of the first embodiment of the hybrid drive, the separating clutch is closed and that the internal combustion engine is then started by means of the drive torque of the electric machine.

For boost operation provision is made that as needed, i.e., when the flow of power from the internal combustion engine currently takes place via a gear G1, G3, G5, G7 assigned to the first input shaft, first one of the forward gears G2, G4, G6 assigned to the second input shaft is engaged or the shifting clutch is engaged, and that the electric machine then is operated as a motor, i.e., emits a drive torque.

In similar fashion, for recuperation operation provision is made that, as needed, first a forward gear G2, G4, G6 assigned to the second input shaft is engaged or the shifting clutch is engaged, and that the electric machine is then operated as a generator, i.e., receives generator torque active in the drive train as drag torque.

For electric drive operation provision is made that in the event of an opened separating clutch, disengaged shifting clutch and disengaged gears G1-G7, R first a gear G2, G4, G6, R assigned to the second input shaft is engaged and that the electric machine is then operated as a motor, i.e., emits a drive torque.

In the case of a shifting from a low gang, e.g., G3 to a target gear, e.g., G5, occurring during combustion drive operation, both gears being assigned to a first input shaft, to prevent an interruption in torque flow provision is made that first an intermediate gear, e.g., G4, assigned to the second input shaft is synchronized and engaged and that then an engine torque of the electric machine is set up, the engine torque of the internal combustion engine is decreased, as well as the separating clutch being opened. After that the low gear G3 is disengaged and the target gear G5 is synchronized and engaged before the engine torque of the electric machine is in a manner overlapping in time decreased again, the engine torque of the internal combustion engine is set up again and the separating clutch is closed. Finally the intermediate gear G4 is disengaged again. The shifting clutch is permanently disengaged during this shifting sequence.

In the case of a shifting from a low gear assigned to the first input shaft, e.g., G3 to a target gear assigned to the second input shaft, e.g., G4 occurring during combustion drive operation, to prevent an interruption in torque flow provision is made that first the target gear G4 is synchronized and engaged and that then an engine torque of the electric machine is set up, the engine torque of the internal combustion engine is decreased and the separating clutch is opened. After that the low gear G3 is disengaged and the shifting clutch is synchronized and engaged, before in a manner overlapping in time the engine torque of the electric machine is decreased again, the engine torque of the internal combustion engine is set up again, as well as, as needed, i.e., in the case of the first embodiment of the inventive hybrid drive, the separating clutch is closed.

In the case of a shifting from a low gear assigned to the second input shaft, e.g., G4 to a target gear assigned to the first input shaft, e.g., G5 occurring during combustion drive operation, to prevent an interruption in torque flow provision is made that first an engine torque of the electric machine is set up, the engine torque of the internal combustion engine is decreased and the shifting clutch is disengaged and as needed, i.e., in the case of the first embodiment of the inventive hybrid drive, the separating clutch is opened. After that the target gear G5 is synchronized and engaged, before in a manner overlapping in time the engine torque of the electric machine is decreased again, the engine torque of the internal combustion engine is set up again, and the separating clutch is closed. Finally the low gear G4 is disengaged.

In the case of a shifting from a low gear, e.g., G4 to a target gear, e.g., G6 occurring during combustion drive operation, both gears being assigned to the second input shaft, to prevent an interruption in torque flow provision is made that first an engine torque of the electric machine is set up, the engine torque of the internal combustion engine is decreased and the shifting clutch is disengaged and as needed, i.e., in the case of the first embodiment of the inventive hybrid drive, the separating clutch is opened. After that an intermediate gear assigned to the first input shaft, e.g., G5 is synchronized and engaged, before in a manner overlapping in time the engine torque of the electric machine is decreased again, the engine torque of the internal combustion engine is set up again, as well as the separating clutch being closed. Then the low gear G4 is disengaged and the target gear G6 is synchronized and engaged. Subsequently an engine torque of the electric machine is set up, the engine torque of the internal combustion engine is decreased and the separating clutch is opened. After that the intermediate gear G5 is again disengaged and the shifting clutch is synchronized and engaged, before in a manner overlapping in time the engine torque of the electric machine is again decreased, the engine torque of the internal combustion engine is set up again, and as needed, i.e., in the case of the first embodiment of the inventive hybrid drive, the separating clutch is closed.

It is self-evident in the knowledge of the invention that the shifting processes described for traction operation of the internal combustion engine are feasible in similar fashion in the event of an overrun operation of the internal combustion engine, wherein the engine torque of the internal combustion engine then is a drag torque and the engine torque of the electric machine is a generator torque active as drag torque.

For clarification of the invention a drawing with exemplary embodiments has been attached to the description. The figures in the drawing show the following

Figure 5:
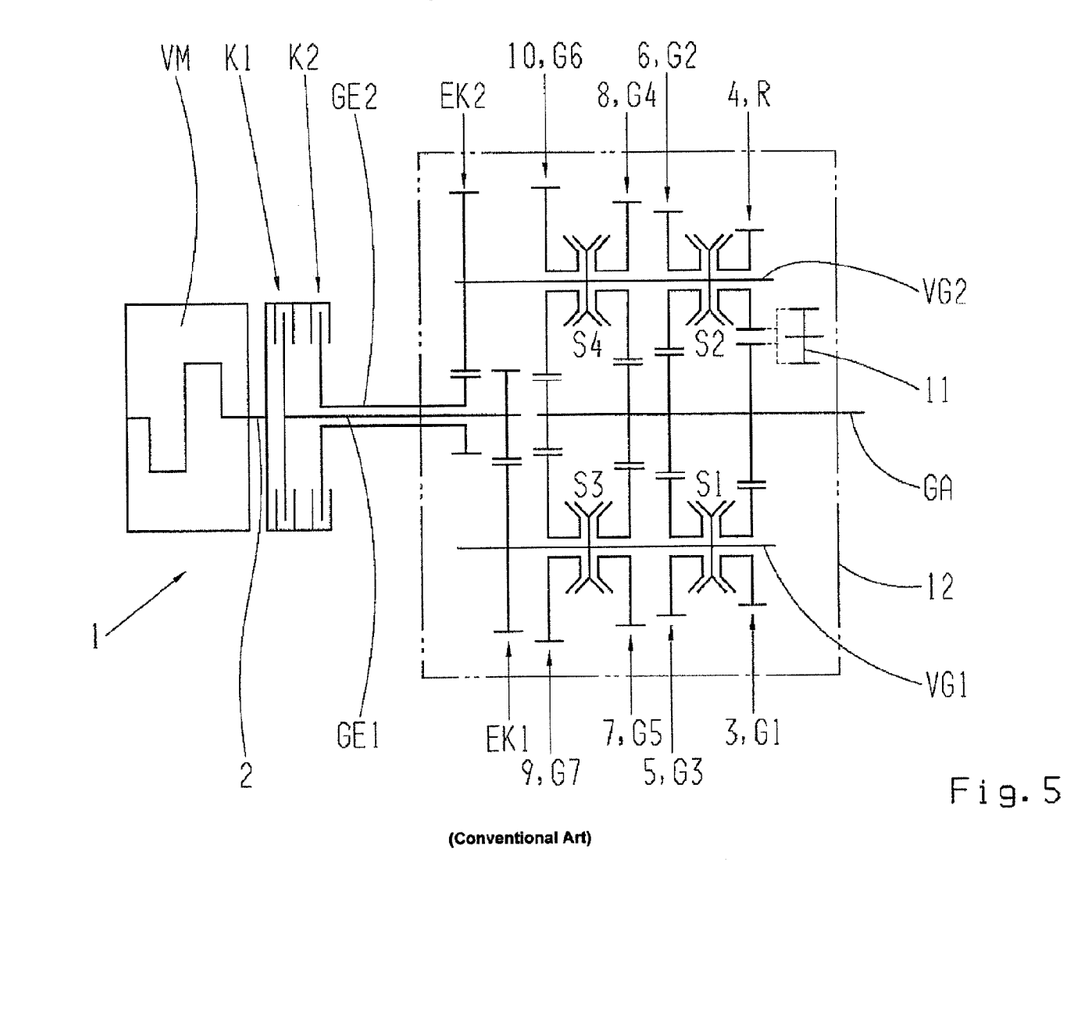
FIG. 5 shows a double clutch transmission from which the two embodiments of the hybrid drive according to FIGS. 1 through 4 are derived in a schematic representation.

Thus in FIG. 5 a double clutch transmission 1 is shown in schematic form, from which embodiments and modifications of an inventive hybrid drive of a motor vehicle are derived and subsequently described. The double clutch transmission 1 exhibits two coaxially arranged input shafts GE1, GE2 and a common output shaft GA. The first input shaft GE1 is arranged centrally within the second input shaft GE2 which is embodied as a hollow shaft. Both input shafts GE1, GE2 can be connected on the input side to the drive shaft 2 of an internal combustion engine VM via assigned separating clutches K1, K2. The separating clutches K1, K2 in FIG. 5 are designed as friction clutches. On the output side both input shafts GE1, GE2 are in drive connection with an assigned countershaft VG1, VG2 via an input constant EK1, EK2 formed from two fixed gears.

Each countershaft VG1, VG2 can be selective placed in drive connection with the common output shaft GA via a plurality of gearwheel sets 3, 5, 7, 9 or 4, 6, 8, 10 with a different transmission ratio. Each of the gearwheel sets 3, 5, 7, 9 or 4, 6, 8, 10 assigned to the first input shaft GE1 and the second input shaft GE2 consists of a movable gear pivoted on the assigned countershaft VG1, VG2 which can be coupled to said countershaft via a speed clutch as well as a fixed gear rotationally fixed on the output shaft GA. This results in a total of seven forward gears G1 through G7 and in combination with an intermediate gear 11 one rear gear R.

The speed clutches of the gearwheel sets are embodied as friction-synchronized synchronous clutches and each combined by pairs in shifting groups S1, S2, S3, S4. In addition, by way of example, the gearwheel sets 3, 5, 7, 9 or 4, 6, 8, 10 of both countershafts VG1, VG2 are each arranged in pairs on a common radial plane and each use a common fixed gear on the output shaft GA. The transmission-side sections of the input shafts GE1, GE2, the input constants EK1, EK2, the two countershafts VG1, VG2, the gearwheel sets 3, 5, 7, 9 and 4, 6, 8, 10 with the shifting groups S1-S4 and the transmission side section of the output shaft GA are arranged within a transmission housing 12.

Figure 1:
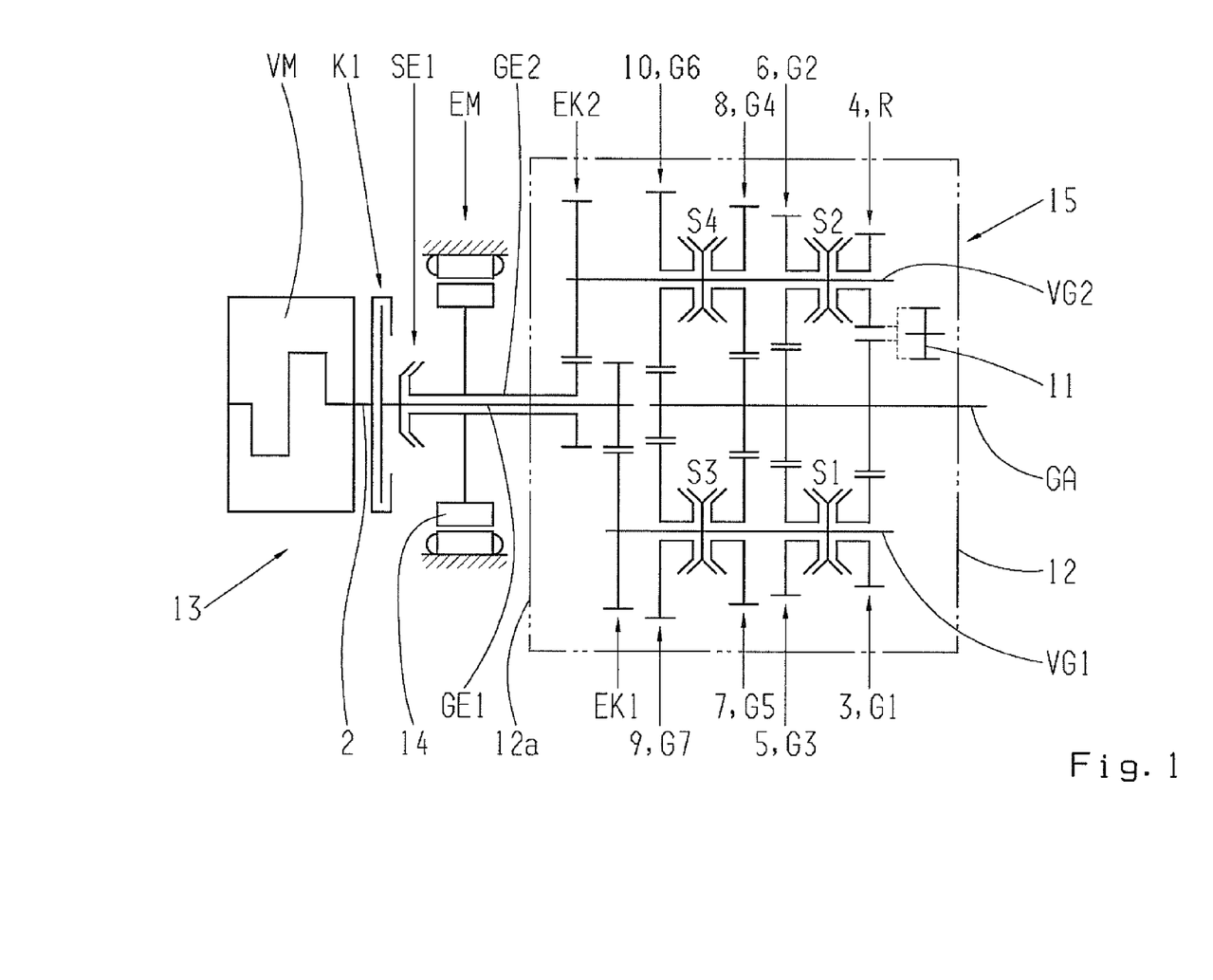
FIG. 1 shows a first embodiment of an inventive hybrid drive in a schematic representation.

The formation of these components represented in FIG. 1 is only of exemplary character for the present invention up to the function of the selectively producible drive connection between the coaxial input shafts GE1, GE2 and the output shaft GA. The gear internal formation and arrangement of the components, such as the location of the output shaft GA relative to the input shafts GE1, GE2, the use and arrangement of countershafts VG1, VG2, and the formation as well as arrangement of the gearwheel sets 3, 5, 7, 9 or 4, 6, 8, 10, can hence also be organized any other way.

Based on the double clutch transmission 1 according to FIG. 5, a first embodiment of an inventive hybrid drive 13 according to FIG. 1 is created by omitting the second separating clutch K2 and providing an electric machine EM that can be operated as a motor and as a generator whose rotor 14 is in drive connection with the second input shaft GE2, and by providing an engageable and disengageable positive shifting clutch SE1, through which both input shafts GE1 and GE2 can be coupled to one another.

The actual manual transmission 15, i.e., the components arranged within the transmission housing 12, such as the input constants EK1, EK2, the countershafts VG1, VG2, the gearwheel sets 3 through 10, the shifting clutches S1-S4 and the output shaft GA are by and large unchanged compared to the double clutch transmission 1.

In this embodiment of the hybrid drive 13, the electric machine EM is coaxially arranged over the second input shaft GE2 and the rotor 14 of the electric machine EM is directly connected for rotation with the second input shaft GE2. By way of example the shifting clutch SE1 is embodied as a friction synchronized synchronous clutch. The electric machine EM and the shifting clutch SE1 are arranged outside of the transmission housing 12 between the remaining separating clutch K1 and a front wall 12a on the motor side of the transmission housing 12 and together with the separating clutch advantageously occupy about the installation space of a double clutch arrangement of a by and large equivalent double clutch transmission 1 according to FIG. 5. The separating clutch K1 in FIGS. 1 through 4 is designed as a friction clutch.

Figure 2:
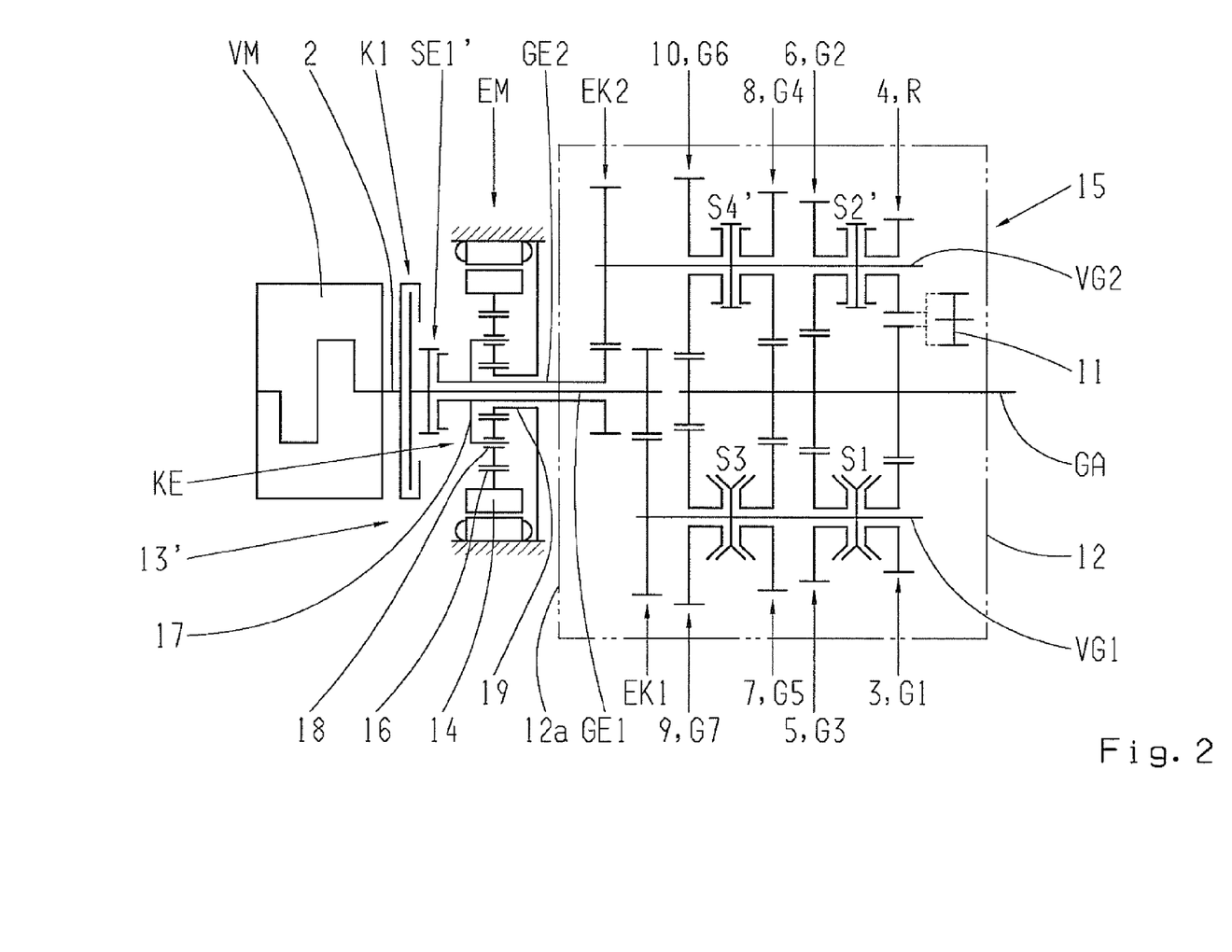
FIG. 2 shows a further development of the first embodiment of the hybrid drive according to FIG. 1.

A further development of the inventive hybrid drive 13' shown in FIG. 2 differs from the hybrid drive 13 in FIG. 1 in that the shifting clutch SE1' is embodied now as an unsynchronized dog clutch, the rotor 14 of the electric machine EM is now in drive connection with the second input shaft GE2 via a transmission stage KE and the speed clutches S2', S4' of the gearwheel sets 4, 6, 8, 10 assigned to the second input shaft GE2 now are embodied as unsynchronized dog clutches.

The transmission stage KE is embodied as a simple planetary transmission with a hollow gear 16, a planetary carrier 17 with a plurality of planetary gears 18 in meshing engagement with the hollow gear 16 and a sun gear 19 in meshing engagement with the planetary gears 18. The hollow gear 16 is rotationally fixed to the rotor 14 of the electric machine EM, the planetary carrier 17 is rotationally fastened on the second input shaft GE2 and the sun gear 19 is latched rigidly to the housing. The transmission stage KE hence exhibits a transmission ratio in the range between iKE=1.25 and iKE=1.67.

As a result of this the electric machine EM can be embodied with lower output and correspondingly more compact as well as lighter without exhibiting critically high service speeds.

Figure 3:
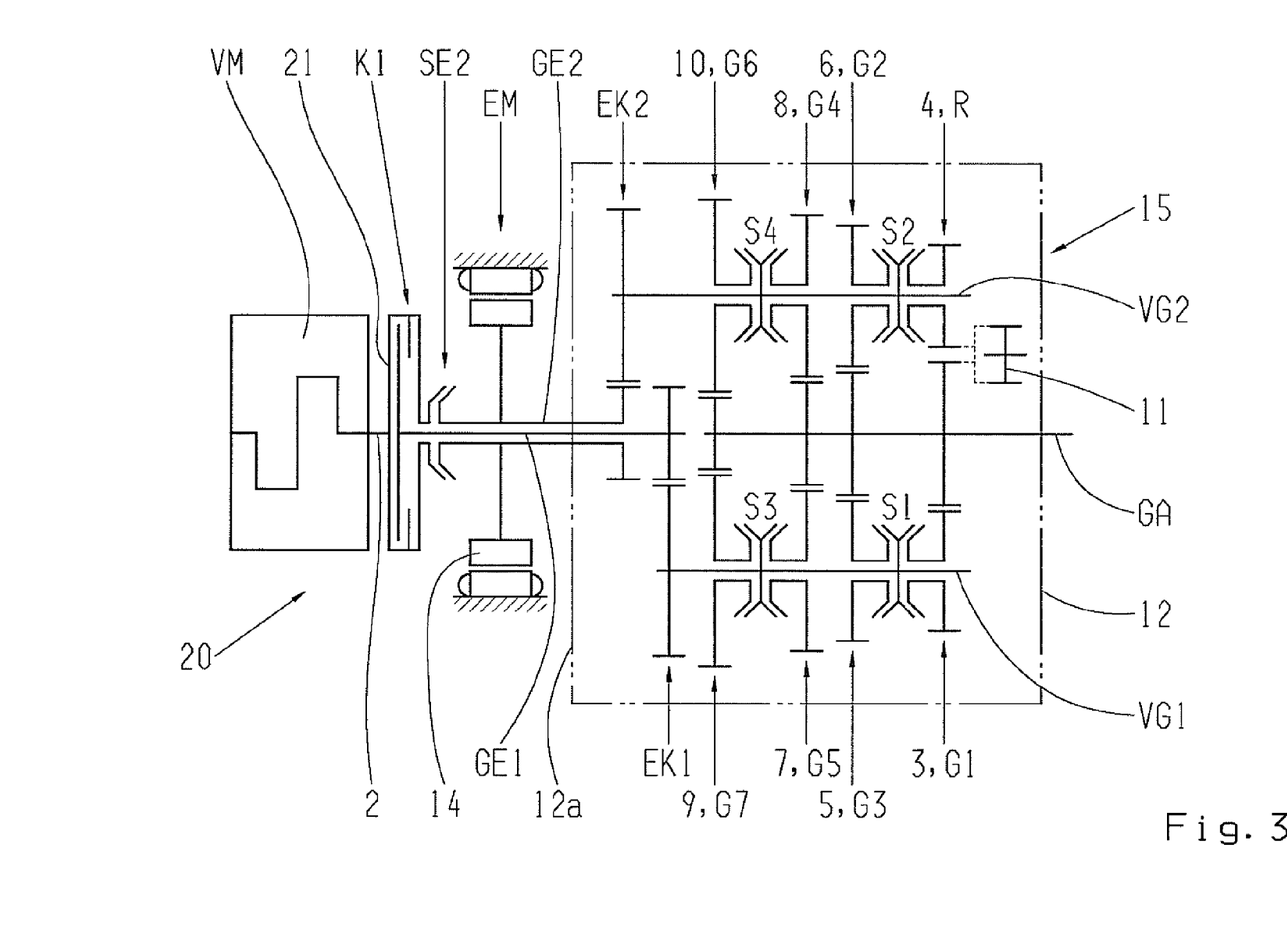
FIG. 3 shows a second embodiment of an inventive hybrid drive in a schematic representation.

Based on the double clutch transmission 1 according to FIG. 5, a second embodiment of an inventive hybrid drive 20 according to FIG. 3 is created by omitting the second separating clutch K2, by providing an electric machine EM that can be operated as a motor and as a generator whose rotor 14 is in drive connection with the second input shaft GE2 and by providing an engageable and disengageable positive shifting clutch SE2 via which a part 21 of the remaining separating clutch K1 on the motor side, such as a clutch basket and the second input shaft GE2 can be coupled to one another.

As in the first embodiment of the hybrid drive 13 according to FIG. 1, the electric machine EM in accordance with FIG. 3 is coaxially arranged over the second input shaft GE2 and the rotor 14 of the electric machine EM is directly rotationally fixed to the second input shaft GE2. The shifting clutch SE2 is presently embodied as a friction synchronized synchronous clutch by way of example. The electric machine EM and the shifting clutch SE2 are in turn arranged outside the transmission housing 12 between the remaining separating clutch K1 as well as the front wall 12a on the motor side of the transmission housing 12 and together with the separating clutch K1 likewise occupy about the installation space of a double clutch arrangement K1, K2 of a by and large equivalent double clutch transmission 1 according to FIG. 5.

Figure 4:
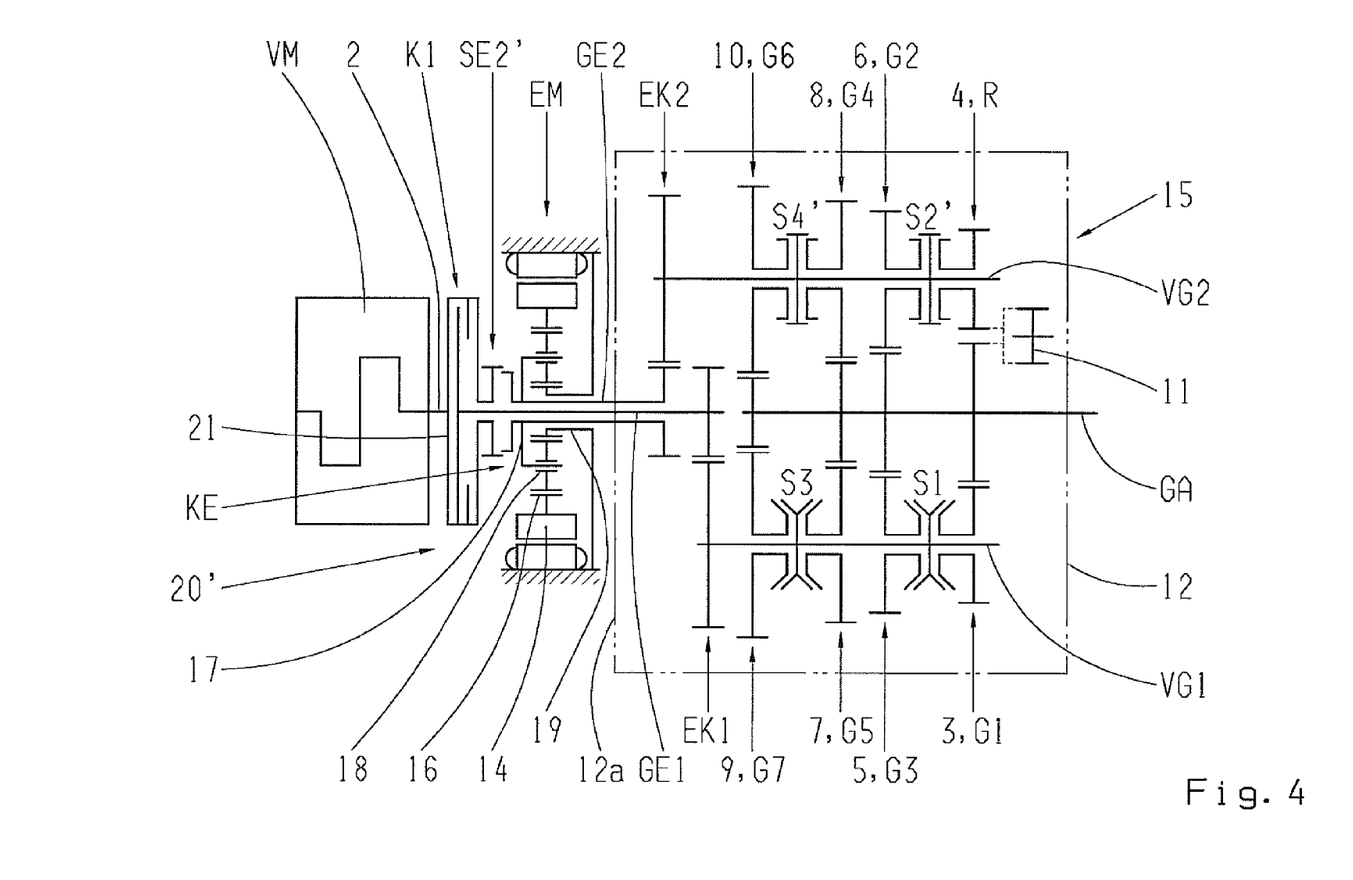
FIG. 4 shows a further development of the second embodiment of the hybrid drive according to FIG. 3.

A further development of the inventive hybrid drive 20' shown in FIG. 4 differs from the hybrid drive 20 according to FIG. 3 in that the shifting clutch SE2' is now embodied as an unsynchronized dog clutch, the rotor 14 of the electric machine EM, as in the case of the hybrid drive 13' according to FIG. 2, is in drive connection with the second input shaft GE2 via a transmission stage KE embodied as a simple planetary transmission and the speed clutches S2', S4' of the gearwheel sets 4, 6, 8, 10 assigned to the second input shaft GE2 are likewise embodied as dog clutches.

With the previously described embodiments a parallel active hybrid drive 13, 13', 20, 20' with a design based on a double clutch transmission 1 is created, which comprises an electric machine EM and an automated transmission 15 with two power transmission branches. The components arranged within the transmission housing 12, such as the input constants EK1, EK2, the countershafts VG1, VG2, the gearwheel sets 3, 5, 7, 9 as well as 4, 6, 8, 10 with the speed clutches 51, S3 as well as S2, S4 and the output shaft GA, and the transmission housing 12 itself if applicable, can be adopted by and large unchanged from the original double clutch transmission 1.

By the elimination of the second separating clutch K2, the arrangement of the electric machine EM, and the additional shifting clutch SE1, SE1' as well as SE2, SE2' between the remaining separating clutch K1 and the front wall 12a on the motor side of the transmission housing 12, the installation space of the original double clutch transmission 1 can be largely adhered. The inventive hybrid drive 13, 13' as well as 20, 20' can hence be produced cost-effectively and can be used without significant changes to the relevant motor vehicle as an alternative to the conventional drive with the double clutch transmission 1.

The range of functions of the inventive hybrid drive 13, 13' or 20, 20' includes a starting of the internal combustion engine VM by means of the electric machine EM. In the first embodiment of the hybrid drive 13, 13' a pulse starting of the internal combustion engine VM is also possible. In addition a boost and recuperation operation of the electric machine EM during a combustion drive mode is possible. A pure electric drive operation is possible in the case of the first embodiment 13, 13' via all gears G1, G3, G5, G7 or G2, G4, G6, R and in the case of the second embodiment 20, 20' only via the gears G2, G4, G6, R assigned to the second input shaft GE2.

In combustion drive all gears G1, G3, G5, G7 as well as G2, G4, G6, R can be used with embodiments 13, 13' or 20, 20', wherein an interruption of traction or thrust caused by shifting can be avoided through temporary load transmission through the electric machine EM. In the case of an unsynchronized execution of the speed clutches or shifting groups S2' S4' and the respective switching clutches SE1', SE2' in accordance with the embodiments of the hybrid drive 13', 20' according to FIGS. 2 and 4, they are each synchronized prior to the engagement by the electric machine EM or by the electric machine EM or the internal combustion engine VM.

REFERENCE SIGNS

1 Double clutch transmission
2 Drive shaft of the internal combustion engine
3, 5, 7, 9 Gearwheel sets
4, 6, 8, 10 Gearwheel sets
11 Intermediate gear
12 Transmission housing
12a Front wall on the motor side of the transmission housing
13 Hybrid drive
13' Hybrid drive
14 Rotor of the electric machine
15 Manual transmission
16 Hollow gear
17 Planetary carrier
18 Planetary gear
19 Sun gear
20 Hybrid drive
20' Hybrid drive
21 Part of the first separating clutch on the motor side
EK1 First input constant
EK2 Second input constant
EM Electric machine
G1-G7 Forward gears
GA Output shaft
GE1 First input shaft
GE2 Second input shaft
$i_{KE}$ Transmission ratio of the transmission stage KE
K1 First separating clutch
K2 Second separating clutch
KE Transmission stage
R Reverse gear
S1, S3 Shifting groups
S2, S4 Shifting groups
S2', S4' Shifting groups
SE1 Shifting clutch
SE1' Shifting clutch
SE2 Shifting clutch
SE2' Shifting clutch
VM Internal combustion engine
VG1 First countershaft
VG2 Second countershaft

The invention claimed is:

1. A hybrid drive of a motor vehicle, comprising a multistage manual transmission, the multistage manual transmission comprising:
   a second input shaft, being a hollow shaft, connected to a rotor of an electric machine;
   a first input shaft, being centrally within the second input shaft;

an output shaft selectively connectable to the first input shaft and the second input shaft via a plurality of gearwheel sets and a shiftable speed clutch;

an engageable and disengageable positive shifting clutch configured to couple to the first input shaft and the second input shaft;

a separating clutch connected to the first shaft at a first side of the separating clutch and configured to connect to a drive shaft of a power engine at a second side of the separating clutch;

a first countershaft configured to maintain a drive connection with the first input shaft via fixed gears;

a second countershaft configured to maintain a drive connection with the second input shaft via fixed gears; and a transmission housing, wherein the plurality of gearwheel sets, the shiftable speed clutch, and the first and second countershafts are contained within the transmission housing, wherein the electric machine and the engageable and disengageable positive shifting clutch are located outside the transmission housing.

2. The hybrid drive according to claim 1, wherein a part of the separating clutch on the second side and the second input shaft are configured to be coupled to one another via the engageable and disengageable positive shifting clutch.

3. The hybrid drive according to claim 1, wherein the electric machine and the engageable and disengageable positive shifting clutch are arranged between the separating clutch and a wall of the transmission housing facing towards the power engine; and the electric machine, the engageable and disengageable positive shifting clutch, and the separating clutch occupy an installation space of a double clutch arrangement of an equivalent double clutch transmission.

4. The hybrid drive according to claim 1, wherein the engageable and disengageable positive shifting clutch is one of a friction synchronized synchronous clutch and an unsynchronized dog clutch.

5. The hybrid drive according to claim 1, wherein at least one of the shiftable speed clutches of the gearwheel sets assigned to the second input shaft are unsynchronized dog clutches.

6. The hybrid drive according to claim 1, wherein the electric machine is coaxially arranged over the second input shaft and that the rotor of the electric machine is directly rotationally fixed to the second input shaft or is in drive connection with the second input shaft via a transmission stage.

7. The hybrid drive according to claim 6, wherein the transmission stage is a planetary transmission comprising:
a hollow gear,
a planetary carrier with a plurality of planetary gears in meshing engagement with the hollow gear, and
a sun gear in meshing engagement with the planetary gears,
wherein the hollow gear is rotationally fixed to the rotor of the electric machine, the planetary carrier is rotationally fastened on the second input shaft and the sun gear is latched rigidly to the transmission housing.

8. The hybrid drive according to claim 1, wherein the electronic machine is arranged axially parallel to the second input shaft and the rotor of the electric machine is in drive connection with the second input shaft via a transmission stage.

9. The hybrid drive according to claim 8, wherein the transmission stage is one of:
a spur gear transmission with a first gear rotationally fixed to the rotor of the electric machine and a second gear rotationally fixed to the second input shaft and being in meshing engagement with the first gear; and
a chain transmission with a first chain sprocket rotationally fixed to the rotor of the electric machine and a second chain sprocket arranged in rotationally fixed manner on the second input shaft as well as being in positive drive connection with the first chain sprocket via a closed link chain.

10. The hybrid drive according to claim 8, wherein the transmission stage is a belt transmission with a first pulley rotationally fixed to the rotor of the electric machine and a second pulley arranged in rotationally fixed manner on the second input shaft as well as being in non-positive drive connection with the first pulley.

11. The hybrid drive according to claim 6, wherein the transmission stage comprises a transmission ratio between 1.25 and 1.67.

* * * * *